UNITED STATES PATENT OFFICE.

JULIUS SCHENKEL, OF DORTMUND, GERMANY.

PROCESS OF FIREPROOFING WOOD.

SPECIFICATION forming part of Letters Patent No. 647,428, dated April 10, 1900.

Application filed June 2, 1899. Serial No. 719,054. (No specimens.)

*To all whom it may concern:*

Be it known that I, JULIUS SCHENKEL, chemist, a subject of the King of Prussia, Emperor of Germany, residing at Hohenzollernstrasse 9, Dortmund, in the Kingdom of Prussia and German Empire, have invented certain new and useful Improvements in Processes and Materials for Impregnating Wood and the Like, of which the following is a full, clear, and exact description.

According to certain of the processes heretofore in use for reducing the combustibility of wood and other material the wood or other material is first boiled in a solution of sulphate of iron and clay (oxid of aluminium) and then in a solution of calcium chloride and lime. By the action of the acid salts at a boiling heat a partial loosening of the fibers of the wood is produced, and in the second boiling process a deposit of gypsum on the fibers of the wood must occur on the meeting together of the salt solutions in the interior of the wood, whereby the cells are more or less burst or broken open and injured both chemically and mechanically. These evil effects are obviated by the use of the present invention, according to which the wood is not boiled, but is merely submitted at ordinary temperatures—that is, in the cold or without boiling—to a soaking process in a liquid of the following composition: Fifty to one hundred parts, by weight, of burnt lime are dissolved in a solution of about one hundred parts, by weight, of fused calcium chloride in about three hundred and fifty parts, by weight, of water, or in a fifteen to thirty per cent. solution of calcium chloride. The solution of the lime is preferably facilitated by stirring or agitating, and it is advisable to use the material thus produced while it is fresh. The caustic lime is added to the calcium-chloride solution in order to correct the hygroscopic property of the calcium chloride—that is to say, in order to thoroughly dry the compound both in and on the wood by the production of a solution of basic calcium chloride.

As is well known, calcium-chloride solution alone always makes wood moist and greasy by absorbing water from the air.

By reason of the strength of the calcium-chloride and lime solution employed the desired effect is obtained on the wood without the necessity for boiling, and the injury to the wood by boiling is thus avoided.

The soaking in or impregnation with the new liquid may be preceded by one of the known processes used for other liquids. For example, timber may be exhausted of air in a closed vessel and then be impregnated with the above-described liquid under pressure, after which the drying may be effected in the usual way; but in any case the wood according to my invention is subjected to the action of the calcium-chloride and lime solution directly—that is, without any previous impregnation with other substances—and the effect of the process is to leave the wood impregnated with lime and chloride of lime and not with precipitated products resulting from chemical action between these lime salts and other compounds, such as the sulphates of iron and aluminium above referred to. Owing to this fact I attain the result of rendering the wood fireproof without causing any weakening thereof, such as would be caused by the disruption of the fibers by the deposition of precipitated material therein or thereon, as above explained.

What I claim, and desire to secure by Letters Patent, is—

The herein-described process of preparing wood with an impregnation of lime and chloride of lime, to render it fireproof, consisting in subjecting the wood directly and at ordinary temperatures to a strong solution of calcium chloride and lime, in the absence of any material tending to decompose the chloride of lime.

In witness whereof I subscribe my signature in presence of two witnesses.

JULIUS SCHENKEL.

Witnesses:
 ALB. GIERDEN,
 WILLIAM H. MADDEN.